(12) United States Patent
Lau et al.

(10) Patent No.: US 11,640,742 B2
(45) Date of Patent: May 2, 2023

(54) SMART VENDING MACHINE WITH MODULAR CONTROL ASSEMBLY

(71) Applicant: PepsiCo, Inc., Purchase, NY (US)

(72) Inventors: Cheuk Chi Lau, White Plains, NY (US); Xuejun Li, Pleasantville, NY (US); Yong Jin Serock, Newtown, CT (US); Bilal Bajwa, Raleigh, NC (US); Naga Vankadari, White Plains, NY (US)

(73) Assignee: PepsiCo, Inc., Purchase, NY (US)

( * ) Notice: Subject to any disclaimer, the term of this patent is extended or adjusted under 35 U.S.C. 154(b) by 4 days.

(21) Appl. No.: 17/360,483

(22) Filed: Jun. 28, 2021

(65) Prior Publication Data

US 2022/0415113 A1 Dec. 29, 2022

(51) Int. Cl.
*G07F 9/10* (2006.01)
*G05B 19/042* (2006.01)

(52) U.S. Cl.
CPC .......... *G07F 9/105* (2013.01); *G05B 19/042* (2013.01); *G05B 2219/2645* (2013.01)

(58) Field of Classification Search
None
See application file for complete search history.

(56) References Cited

U.S. PATENT DOCUMENTS

| 8,417,381 B2 * | 4/2013 | Vonk | G16H 20/10 700/244 |
| 2015/0088306 A1 * | 3/2015 | Varrasso | G07F 9/001 221/150 R |

OTHER PUBLICATIONS

International Search Report and Written Opinion of the International Searching Authority in counterpart International Application No. PCT/US2022/034289 dated Aug. 3, 2022 (7 pages).

* cited by examiner

*Primary Examiner* — Gene O Crawford
*Assistant Examiner* — Ayodeji T Ojofeitimi
(74) *Attorney, Agent, or Firm* — Sterne, Kessler, Goldstein & Fox P.L.L.C.

(57) ABSTRACT

A vending machine includes a product storage cabinet having a housing defining a storage compartment for storing a product and a door movably connected to the housing. A product sensor is configured to detect removal of the product from the storage compartment. The vending machine further includes a control assembly configured to control operation of the vending machine. The control assembly includes a support structure, a control unit mounted on the support structure, a transceiver mounted on the support structure, and a power supply mounted on the support structure. The control assembly is configured to receive information from collected by the product sensor to determine an identity of the product removed from the storage compartment.

22 Claims, 17 Drawing Sheets

SMART VENDING MACHINE WITH MODULAR CONTROL ASSEMBLY

FIELD

Embodiments described herein generally relate to control assemblies for controlling the operation of open-door vending machines. Specifically, embodiments described herein relate to modular control assemblies for use with any of various product storage cabinets in order to convert the product storage cabinet into a vending machine.

BACKGROUND

Vending machines are commonly used to dispense products to consumers in an unattended manner. Vending machines may be broadly categorized as open-door or closed-door vending machines. In closed-door vending machines, products are stored in a storage compartment that is inaccessible by the consumer. Some closed-door vending machines may include a transparent window that allows consumers to view the products within the storage compartment available for purchase. In other closed-door vending machines, the products may not be visible to the consumer at all, and the consumer may simply select a product from a user interface, such as a touchscreen display.

Closed-door vending machines have the drawback that the consumer is unable to physically select the product for purchase. As a result, the consumer may have limited or no ability to inspect the product or to review product information, such as information on the product label, when determining whether to make a purchase or when determining what item to purchase. As the consumer cannot personally select the particular product for purchase, the consumer may receive the incorrect product or may receive a damaged or expired product. In the event the vending machine malfunctions, the product may not be dispensed at all. As the vending machine is unattended, the consumer generally has no ability to return the damaged or expired product or to seek recourse if the product is not dispensed. As a result, the consumer may have a negative experience and may be unlikely to purchase further products or to use the vending machine again in the future. An additional drawback of closed-door vending machines is that the consumer may be able to select only one product per transaction and may be required to perform multiple transactions to purchase multiple products, which is inconvenient and may dissuade the customer from purchasing multiple products.

In order to address the deficiencies with closed-door vending machines, open-door vending machines provide a consumer with direct access to the storage compartment. The consumer may then manually select and inspect products. The consumer can more easily review product information and can ensure that the desired product is received by the consumer and that the product is not expired or damaged. The consumer also has the ability to return the product to the storage compartment if the consumer decides not to purchase the product. Additionally, the consumer can easily purchase multiple products in a single transaction simply by removing multiple products from the vending machine.

While open-door vending machine provide an improved consumer experience by allowing the consumer to hand-select products for purchase, open-door vending machines face additional technological challenges. In order to charge the consumer for the removed products and to maintain an accurate inventory of the products stored in the vending machine, the vending machine requires sensors or other components to detect removal of products and the identity of the removed products. If the vending machine does not detect removal of products the consumer may not be charged for the product, and if the vending machine does not accurately identify removed products, the inventory of the vending machine may be inaccurate and the consumer may be charged the incorrect price.

Open-door vending machines may also need to detect or prevent tampering by consumers who may try to remove products from the storage compartment without paying or who may try to deceive the vending machine such as by returning foreign objects or by consuming the removed products. The operator of the vending machine may lose revenue if the products removed are not paid for by the consumers. Further, if the products in the storage compartment are disorganized or damaged, other consumers may not want to use the vending machine to purchase the store products. Thus, open-door vending machines may require specially designed computing hardware and software to detect and identify removed products and to detect tampering.

BRIEF SUMMARY OF THE INVENTION

Some embodiments described herein relate to a smart vending machine that includes a product storage cabinet including a housing defining a storage compartment for storing a product and a door movably connected to the housing. The vending machine includes a product sensor configured to detect removal of the product from the storage compartment. The vending machine further includes a control assembly configured to control operation of the vending machine, wherein the control assembly includes a support structure, a control unit mounted on the support structure, a transceiver mounted on the support structure, and a power supply mounted on the support structure. The control assembly of the vending machine may be configured to receive information collected by the product sensor to determine an identity of the product removed from the storage compartment.

In any of the various embodiments described herein, the vending machine may further include a user interface including a display, and the user interface may be in communication with the control assembly.

In any of the various embodiments described herein, the product storage cabinet may further include a cooling unit.

In any of the various embodiments described herein, the product storage cabinet may further include one or more locks configured to maintain the door in a closed position, and the locks may be arranged within the housing.

In any of the various embodiments described herein, the product storage cabinet may include a canopy at an upper end of the housing, and the control assembly may be arranged within the canopy.

In any of the various embodiments described herein, the housing of the product storage cabinet may further define a lower compartment, and the control assembly may be arranged within the lower compartment.

In any of the various embodiments described herein, the control assembly may be arranged on a rear wall of the product storage cabinet, and the rear wall may include one or more bumpers.

In any of the various embodiments described herein, the control assembly may further include a cap securable to the support structure to enclose the control unit, the transceiver, and the power supply within the cap.

In any of the various embodiments described herein, the control assembly may be arranged on an upper end of the product storage cabinet.

In any of the various embodiments described herein, the control assembly may be arranged remotely from the product storage cabinet.

In any of the various embodiments described herein, the vending machine may further include a service panel in communication with the control assembly, wherein the service panel may include a port configured to communicate data to and from the control assembly. In some embodiments, the housing of the product storage cabinet may further define a lower compartment, and the service panel may be arranged within the lower compartment.

Some embodiments described herein relate to a method of manufacturing a smart vending machine that includes arranging a control unit, a power supply and a transceiver on a support structure to form a modular control assembly, and mounting the modular control assembly on a product storage cabinet, wherein the product storage cabinet includes a housing defining a storage compartment and a door movably connected to the housing. The method further includes arranging a product sensor on the product storage cabinet, wherein the product sensor is configured to detect removal of a product from the storage compartment, and arranging a user interface on the product storage cabinet for receiving a user input, wherein the modular control assembly is in communication with the product sensor and the user interface.

In any of the various embodiments described herein, a method for manufacturing a vending machine may further include mounting one or more locks on the product storage cabinet, wherein the one or more locks may be configured to maintain the door in a closed position, and wherein the one or more locks may be in communication with the modular control assembly.

In any of the various embodiments described herein, a method for manufacturing a vending machine may further include mounting a temperature controller on the support structure.

Some embodiments described herein relate to a modular vending machine that includes a product storage cabinet including a housing defining a storage compartment, and a door movably connected to the housing. The vending machine includes a temperature-regulated tray arranged in the storage compartment, and the tray includes a base having a thermal element configured to control a temperature of a product arranged on the tray, a gate connected to the tray and movable from an open position to a closed position, and a lock configured to maintain the gate in the closed position when the lock is activated. The vending machine further includes a control assembly mounted on the product storage cabinet, and the control assembly is configured to activate the lock of the temperature-regulated tray when a spoilage condition is detected.

In any of the various embodiments described herein, the control assembly may include a support structure, a control unit mounted on the support structure, and a power supply mounted on the support structure.

In any of the various embodiments described herein, the vending machine may further include a temperature sensor, wherein the spoilage condition includes a temperature within the storage compartment at or above a predetermined spoilage temperature as determined by the temperature sensor. In some embodiments, the spoilage condition further comprises a minimum amount of time at which the temperature within the storage compartment is at or above the predetermined spoilage temperature.

In any of the various embodiments described herein, the temperature-regulated tray may further include an indicator light configured to indicate whether the lock is activated.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
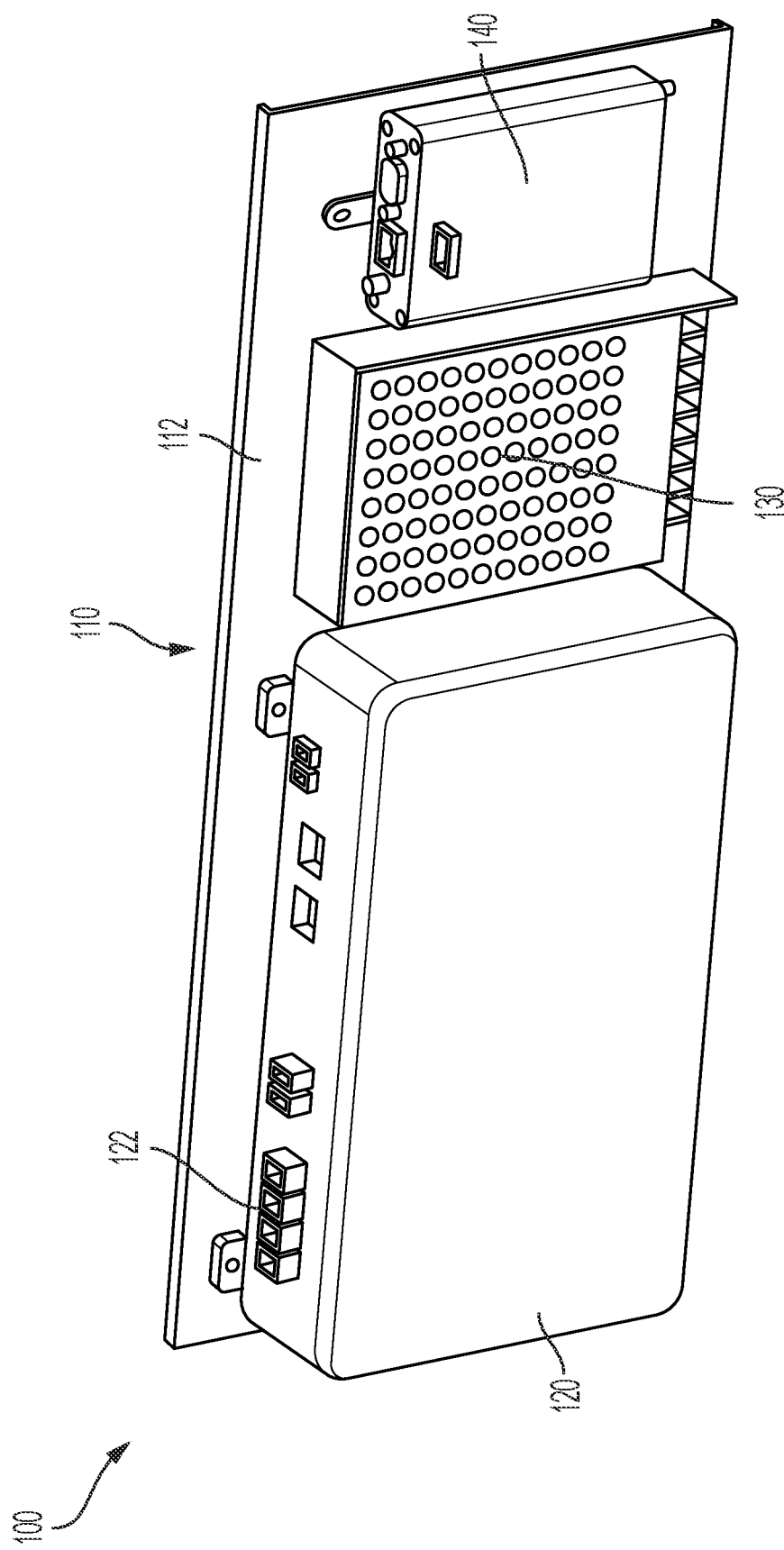
FIG. 1 shows a perspective view of a control assembly for a vending machine according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Vending machines generally include various computing components that control operation of the vending machine. Computing components may be required to control various aspects of operation of the vending machine, such as receiving and processing user input via a user interface, identifying or detecting the consumer, receiving and processing payment, determining the price of the selected products, operating components that dispense the product, and updating the vending machine's inventory of products, among various other tasks. Further, open-door vending machines may require additional computer hardware and software for detecting removal of products from the vending machine, identifying the products removed from the vending machine, detecting tampering, and communicating with other computing devices or servers.

However, the product storage cabinet of the vending machine may have limited space for placement of the computing components. As a result, the location of the computing components may be selected based on the available space. Additional considerations for arranging the computing components include placing the components such that they are accessible to technicians for service and maintenance of the vending machine while not being readily accessible to consumers. Computing components may also be arranged to avoid detracting from the appearance of the vending machine. As a result of these various considerations, computing components are often arranged in multiple positions throughout a vending machine. As a result, a technician may have difficulty locating and accessing the different components at different portions of the vending machine. As product storage cabinets may have different configurations, the location of the computing components may differ from one type or size of product storage cabinet to another. This may also make servicing different vending machines more difficult for the technician.

Further, it is undesirable for a manufacturer of vending machines to have to configure and arrange computing components in a different manner for each vending machine produced. Therefore, there is a need for a modular control assembly that includes the computing components necessary for operating the vending machine in one location and that is capable of use with various types, sizes, and models of product storage cabinets.

Some embodiments described herein relate to a modular control assembly that is configured for use with any of various product storage cabinets to enable operation of the product storage cabinet as a vending machine. In this way, a manufacturer can use the same control assembly to manufacture vending machines having different product storage cabinets, and the manufacturer need not design and arrange computing components depending upon the particular product storage cabinet. Some embodiments described herein relate to a modular control assembly that can be arranged in various locations on a product storage cabinet. In this way, the modular control assembly can be located to facilitate access to and servicing of the control assembly by a technician while limiting or preventing visibility and access to the control assembly by consumers.

Some embodiments described herein relate to a modular control assembly for an open-door vending machine that allows consumers to directly access the storage compartment so that the consumer may select products for purchase as disclosed for example in U.S. application Ser. No. 16/864,676 which relates to product identification systems and methods, and is incorporated herein by reference in its entirety. The open-door vending machine may include a product storage compartment and a door with a lock. The vending machine may include a user interface configured to receive payment or authenticate the consumer prior to providing the consumer with access to the storage compartment. The user interface may also display a product list that includes the prices of the products prior to receiving user identification or payment to allow the consumer to decide if he or she wishes to use the vending machine. Once the consumer gains access to the storage compartment, the consumer may manually select and remove products, and product sensors of the vending machine may detect removal of products, and a control unit may identify the products removed based on the sensor data and automatically charge the consumer. The consumer may close the door to complete the purchase automatically or may complete check-out at the user interface.

Some embodiments described herein relate to a modular control assembly 100, also referred to herein simply as a "control assembly," for controlling operation of a vending machine, as shown for example in FIG. 1. Control assembly 100 may be used in combination with any of various product storage cabinets in order to operate the product storage cabinet as a vending machine. In this way, vending machines may be produced from different types and styles of product storage cabinets but using the same control assembly 100 in order to simplify construction and manufacture of the vending machines.

In some embodiments, control assembly 100 may include a support structure 110 on which components of control assembly 100 are arranged. In some embodiments, control assembly 100 may include all computing components for operating a vending machine. Components may be permanently mounted to support structure 110 or may be removably mounted to support structure 110 to facilitate replacement and upgrade of components and to allow for addition or removal of components from control assembly 100. In some embodiments, support structure 110 may include a plate 112, as shown in FIG. 1. In some embodiments, support structure 110 may include a housing that at least partially encloses components to cover or protect the components.

Control assembly 100 may be mounted on various locations on a product storage cabinet and may be mounted with plate 112 arranged in a horizontal plane or a vertical plane. Support structure 110 may be mounted on product storage cabinet by any of various fastening methods, such as by mechanical fasteners, such as screws, rivets, or bolts, whether directly or via intermediate components, such as brackets or the like. In some embodiments, control assembly 100 may be removably mounted to the product storage cabinet to improve serviceability. However, in some embodiments, control assembly 100 may be permanently secured to the product storage cabinet. Further, in some embodiments, control assembly 100 may be not be mounted on the product storage cabinet and may be located remotely from the product storage cabinet.

Control assembly 100 may control operation of a single vending machine. However, in some embodiments, control assembly 100 may control operation of multiple vending machines. For example, three vending machines may be provided adjacent to one another, and a single control assembly 100 mounted on one of the vending machines may control operation of each of the three vending machines.

This may reduce the cost to manufacture the vending machines by centralizing computing resources in a single control assembly 100.

In some embodiments, control assembly 100 may include a control unit 120 for controlling operation of one or more vending machines. Control unit 120 may include one or more ports 122 for wired communication with other components. Control assembly 100 may further include a power supply 130 configured to provide power to control unit 120. Power supply 130 may receive electrical energy from one or more batteries, a generator, or an electrical outlet, among other sources of electricity. In some embodiments, control assembly 100 may further include a transceiver 140 mounted on support structure 110. Transceiver 140 may be configured to wirelessly communicate with additional components of the vending machine or with remote computing devices. Transceiver 140 may be configured to send and receive data wirelessly. In some embodiments, transceiver 140 may include a wireless router. In some embodiments, transceiver 140 may be combined with control unit 120 such that control unit 120 and transceiver 140 are a single unit.

Figure 2:
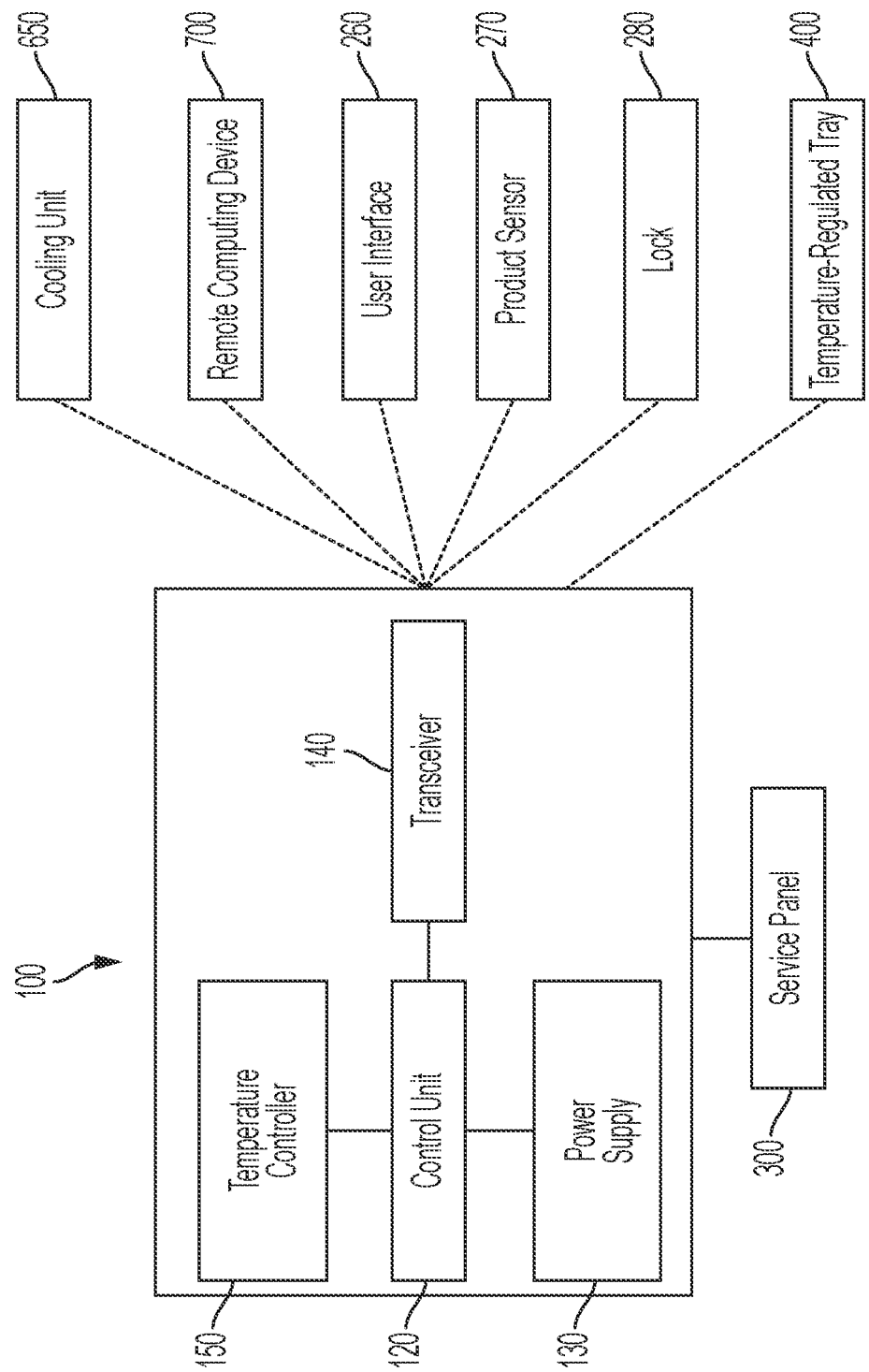
FIG. 2 shows a schematic diagram of components of a vending machine including a control assembly according to an embodiment.

Control assembly 100 may be in communication with other components of vending machine, as shown for example in FIG. 2. In some embodiments, control assembly 100 may communicate with additional components of the vending machine, such as a cooling unit 650, a user interface 260, a product sensor 270, or a lock 280, among others. In some embodiments, control assembly 100 may communicate with a temperature-regulated tray 400 for storing perishable products, as discussed in further detail with respect to FIGS. 13-14. Control assembly 100 may be configured to communicate with a remote computing device 700, such as a host or master computer, a remote server that stores product information, or a mobile electronic device that executes a software application, such as an application for making a purchase by a consumer or a software application for performing service by a technician. In some embodiments, control assembly 100 may include additional components depending on the functionality of the vending machine. In embodiments in which vending machine includes a refrigerated storage compartment, control assembly 100 may include a temperature controller 150 configured to maintain a temperature within a storage compartment of a product storage cabinet of a vending machine at a desired temperature or range of temperatures. In some embodiments, control assembly 100 may be in communication with a service panel 300 such that control assembly 100 may be serviced via service panel 300 as discussed in further detail herein.

Control assembly 100 may communicate with other components of vending machine or with remote computing devices by wireless communication, such as by radio frequency (RF), Bluetooth, WiFi, local area network (LAN), wide area network (WAN), cellular communication (4G, 5G, LTE), or by near field communication, among other wireless communication methods. In some embodiments, control assembly 100 may be in wired communication with one or more components. Alternatively, some components may be in wired communication with control assembly 100 while other components are in wireless communication with control assembly 100. For example, control assembly 100 may be in wired communication with a lock of a door of the product storage cabinet, and may be in wireless communication with a product sensor for detecting removal of products.

In some embodiments, control unit 120 of control assembly 100 may be configured to receive data from a product sensor 270 of a vending machine regarding a product removed from the storage compartment of a product storage cabinet. Control unit 120 may determine an identity of the product based on the information received from product sensor 270. Control unit 120 may then charge the consumer for the identified product and may update the inventory of the vending machine. In some embodiments, product sensor 270 may be configured to collect image data. For example, product sensor 270 may include one or more cameras. In such embodiments, control unit 120 may be configured to perform digital image processing to determine an identity of the product based on the image data from product sensor 270. In some embodiments, control unit 120 may use artificial intelligence and machine learning to improve the accuracy of product identification based on the information received from product sensor 270. Further, control unit 120 may use information received from multiple product sensors 270 to determine an identity of the product. For example, control unit 120 may receive image data from a camera and may receive weight data from a weight sensor, and may use the received image and weight data as inputs to determine an identity of the product.

Figure 3:
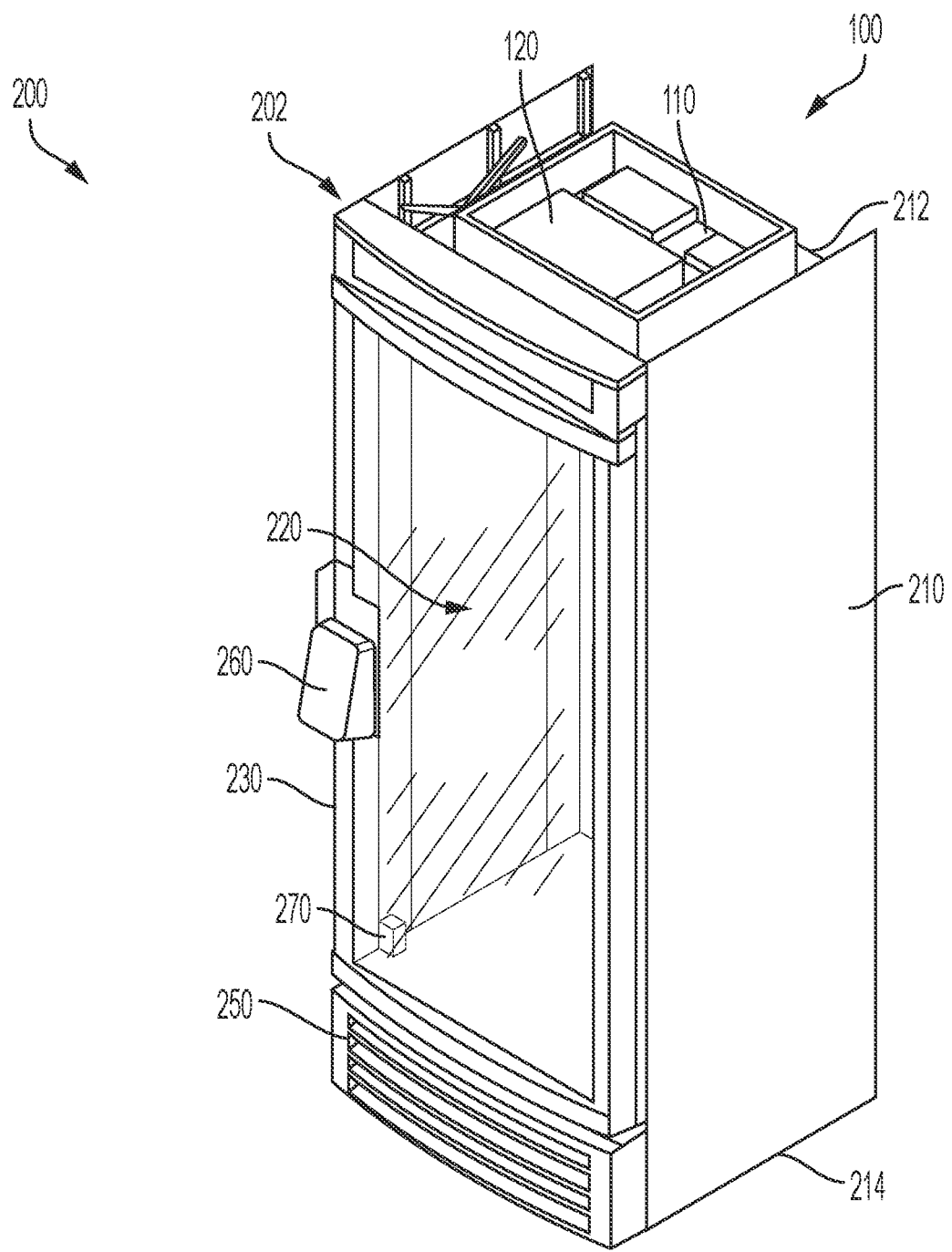
FIG. 3 shows a perspective view of a control assembly arranged on a canopy of a product storage cabinet with a portion of the canopy removed according to an embodiment.

In some embodiments, a vending machine may include a product storage cabinet 200 and control assembly 100, as shown for example in FIG. 3. Product storage cabinet 200 may include a housing 210 defining a storage compartment 220, and a door 230 movably connected to housing 210. Product storage cabinet 200 may be any of various sizes. For example, a full size cabinet may have a storage capacity of about 26 cubic feet, a medium-sized cabinet may have a storage capacity of about 12 cubic feet, and a small cabinet may have a storage capacity of about 2.5 cubic feet. In some embodiments, storage compartment 220 of product storage cabinet 200 may be maintained at ambient temperature. In some embodiments, product storage cabinet 200 may be a cooler and may include a cooling unit 650 configured to maintain storage compartment 220 at a predetermined temperature. Cooling unit 650 may include a vapor-compression refrigeration unit, a thermoelectric cooling unit, or a cold plate, among other cooling or refrigeration units as would be appreciated by one skilled in the art.

Control assembly 100 may be mounted on housing 210 of product storage cabinet 200 in a desired location to control operation of the vending machine, as discussed in further detail below. A user interface 260 may be arranged on or adjacent to product storage cabinet 200 for receiving user input. For example, user interface 260 may be arranged on door 230 of product storage cabinet 200. User interface 260 may be placed in communication with control assembly 100 such that user input received at user interface 260 may be communicated to control assembly 100.

Door 230 of product storage cabinet may include a lock 280 (see, e.g., FIG. 11), or lock 280 may be installed to maintain door 230 in a locked configuration. Lock 280 may be in communication with control assembly 100 such that control assembly 100 may selectively activate lock 280 to prevent door 230 from being opened and to unlock lock 280 to allow door 230 to be opened.

A product sensor 270 for detecting removal of products from storage compartment 220 may be arranged in storage compartment 220 and placed in communication with control assembly 100 to communicate data regarding products removed from storage compartment 220 by the consumer. Product sensor 270 may include an optical sensor, a camera, a LIDAR sensor, an RFID sensor, or a weight sensor, among others.

Figure 4:
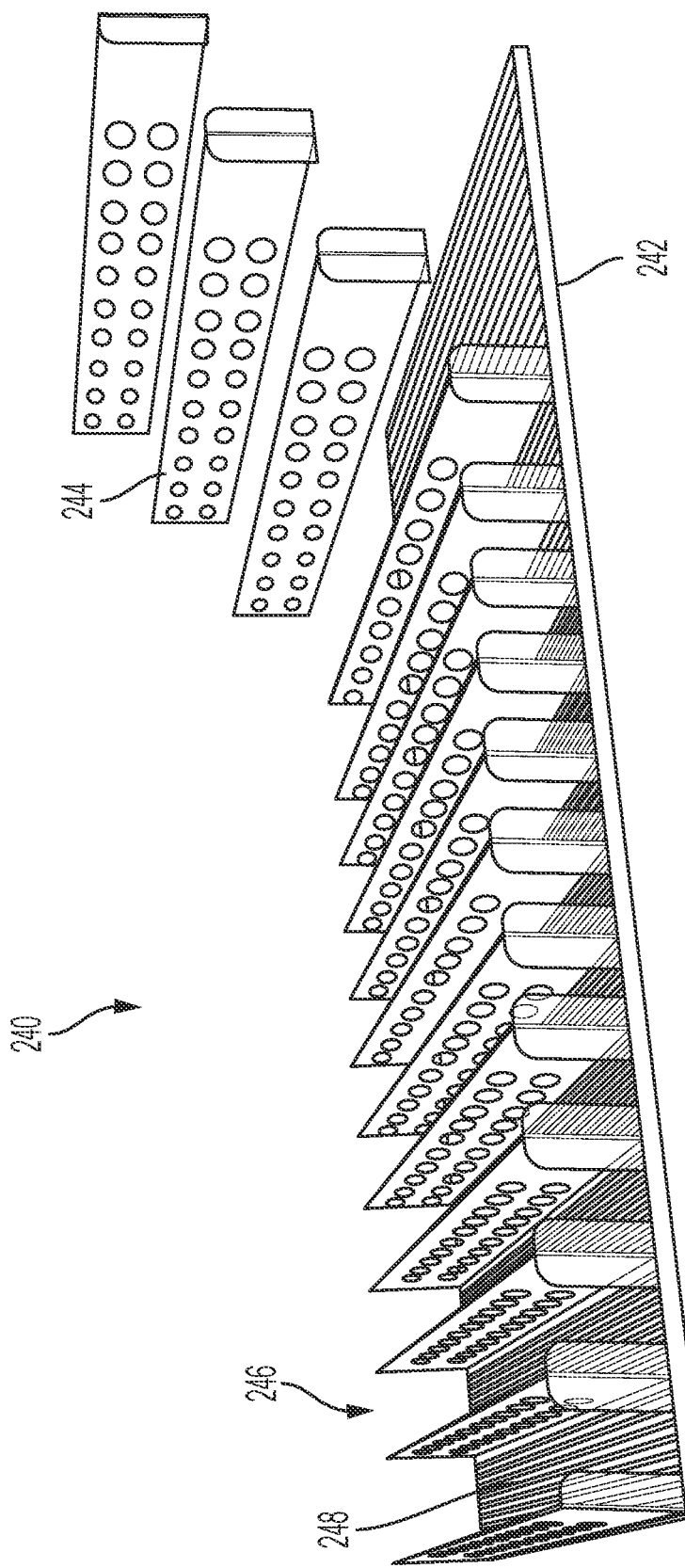
FIG. 4 shows a perspective view of a shelf of a product storage cabinet according to an embodiment.

In some embodiments, storage compartment 220 of product storage cabinet 200 may include a plurality of shelves 240 arranged within storage compartment 220. Each shelf 240 may include a base 242 and one or more dividers 244, as shown for example in FIG. 4. Dividers 244 may be arranged on base 242 in a spaced and parallel configuration so as to define product rows 246 between two adjacent dividers 244. Dividers 244 may be placed on base 242 at desired locations to define rows 246 having different widths. In this way, shelf 240 may be used to support products of different sizes. For example, first and second dividers 244 may be spaced relatively close together to define a first row for holding cans of soda, and second and third dividers 244 may be spaced farther apart to define a wider row 246 storing liters of soda. In some embodiments, base 242 of shelf 240 may include a plurality of slots 248 each configured to receive divider 244 such that divider 244 may be held in place by arranging a divider 244 within a slot 248. Slots 248 may be spaced closely together so as to allow fine adjustment of the width of a row 246 by placement of dividers 244 in slots 248. Dividers 244 may be secured within slots 248 by press fit, snap fit, or via mating connectors, among other removable connection methods.

In some embodiments, product storage cabinet 200 may include a canopy 202 at an upper end 212 of housing 210, as shown in FIG. 3. In such embodiments, control assembly 100 may be arranged on upper end 212 of housing 210 within canopy 202. In this way, control assembly 100 is not visible to or accessible by consumers, but control assembly 100 may be readily accessed for service by removing canopy 202 or by opening a door or gate of canopy 202 at upper end 212 of housing 210.

Figure 5C:
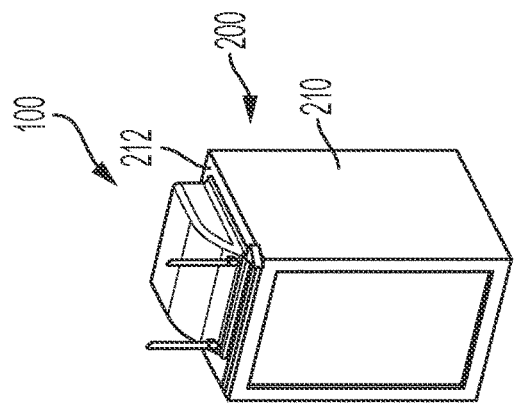
FIGS. 5A-5C show perspective views of control assemblies arranged on an upper end of product storage cabinets according to embodiments.
Figure 5B:
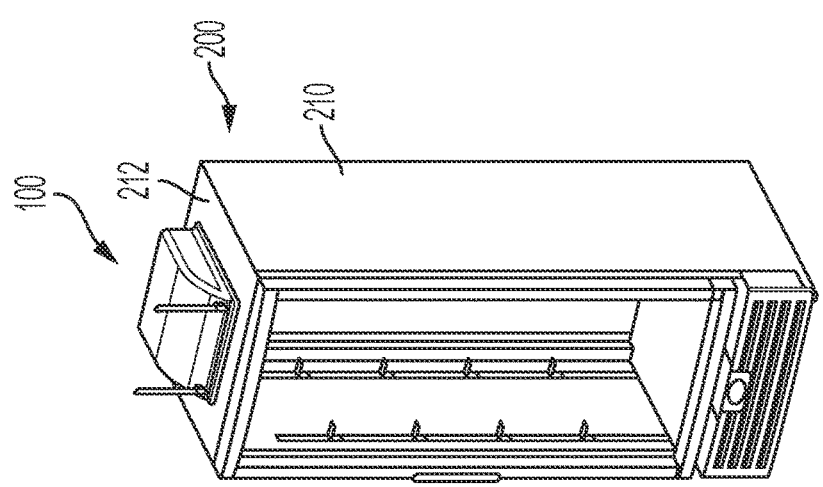
Figure 5A:
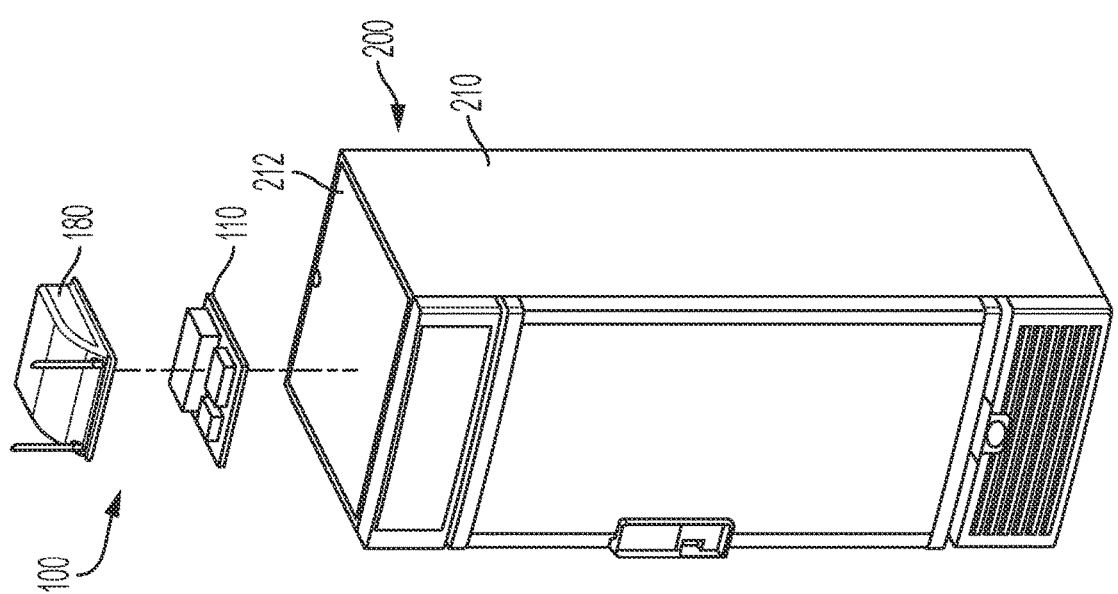

In some embodiments, product storage cabinet 200 may not include a canopy or canopy may contain insufficient space for control assembly 100, as shown in FIGS. 5A-5C. Control assembly 100 may instead be arranged on upper end 212 of housing 210. In such embodiments, control assembly 100 may include a cap 180 for enclosing components of control assembly 100 within cap 180. Cap 180 may enclose components of control assembly 100 so that the components are not visible to or accessible by consumers. Cap 180 may be secured to support structure 110, such as about a perimeter of support structure 110. Further, cap 180 may have a low-profile and may be contoured to avoid detracting from the aesthetic appearance of product storage cabinet 200. Control assembly 100 may be easily accessed by a technician by removing cap 180, and components of control assembly 100 are not visible to or readily accessible by consumers.

Figure 6:
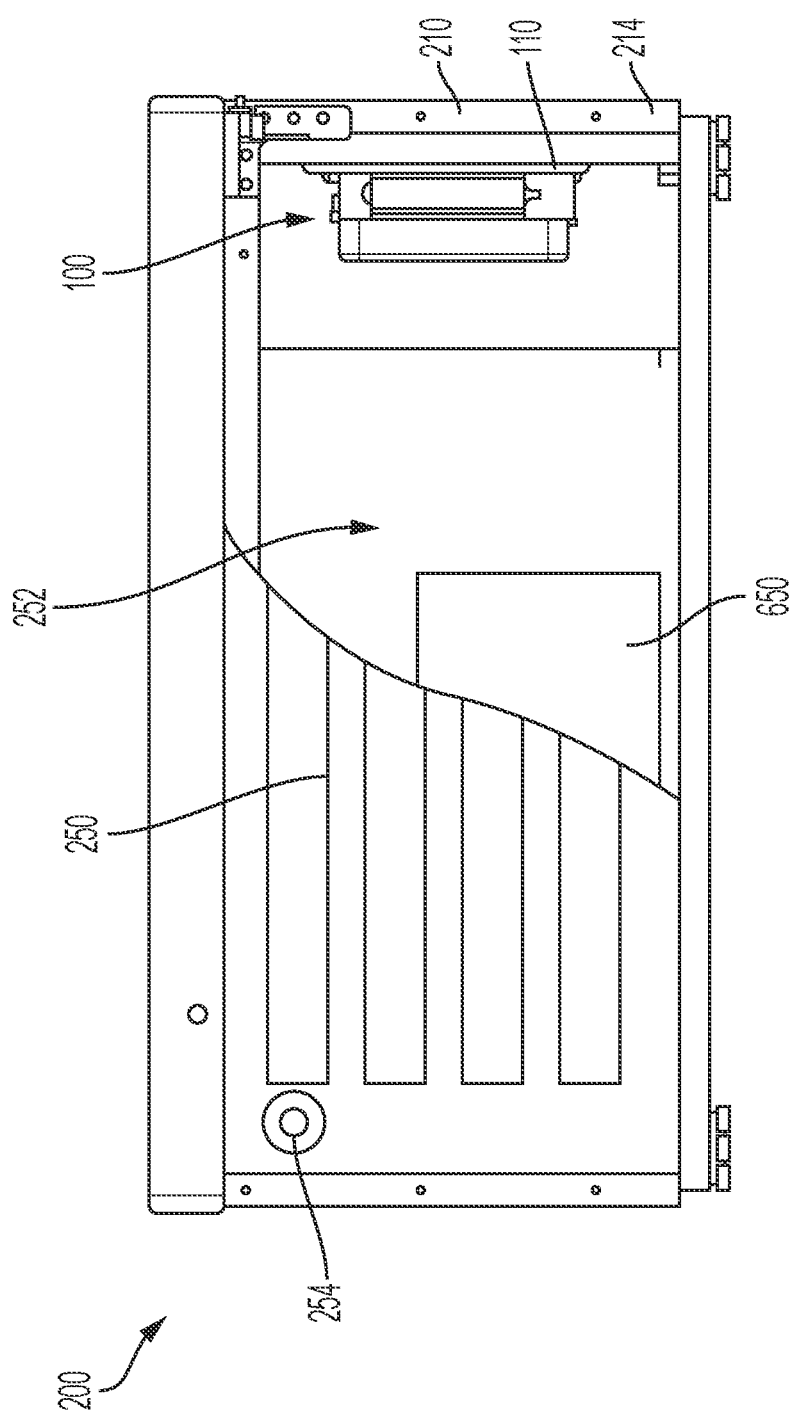
FIG. 6 shows a front view of a lower end of a product storage cabinet having a control assembly according to an embodiment.

In some embodiments, housing 210 of product storage cabinet 200 may define a lower compartment 252 at lower end 214 of housing 210, as shown for example in FIG. 6. Lower compartment 252 may be arranged below product storage compartment. Lower compartment 252 may house a cooling unit 650 of product storage cabinet 200. Control assembly 100 may be arranged within lower compartment 252. In some embodiments, support structure 110 of control assembly 100 may be mounted to a sidewall of housing 210 within lower compartment 252. Thus, support structure 110 may be arranged in a vertical plane. Lower compartment 252 of product storage cabinet 200 may be removably covered by a panel or grille 250. Grille 250 may have a lock 254 to secure grille 250 to housing 210. In this way, control assembly 100 within lower compartment 252 is not visible to consumers but may be easily accessed by a technician by unlocking lock 254 and removing grille 250 from product storage cabinet 200.

Figure 7:
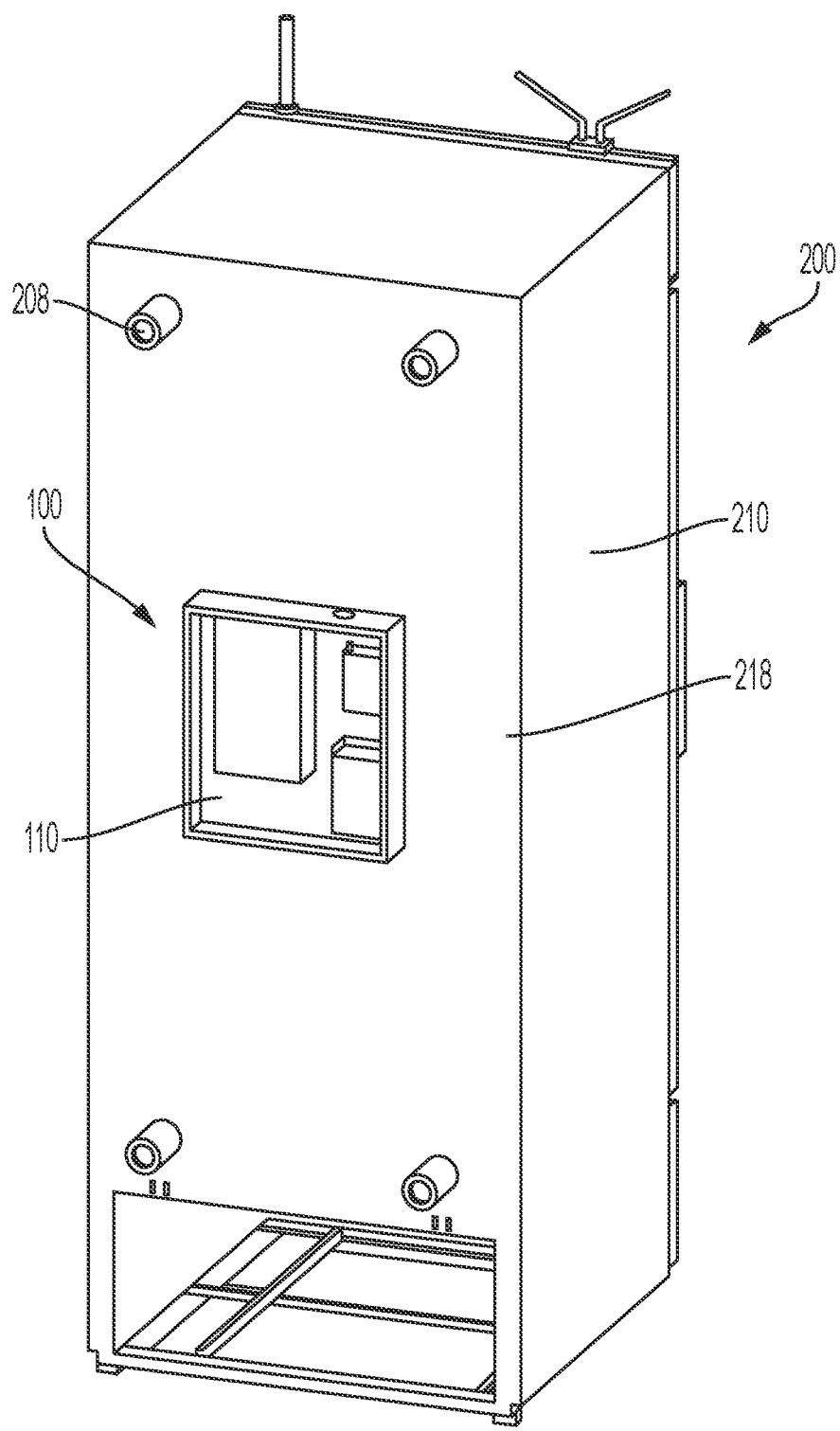
FIG. 7 shows a rear perspective view of a control assembly arranged on a rear wall of a product storage cabinet according to an embodiment.
Figure 8:
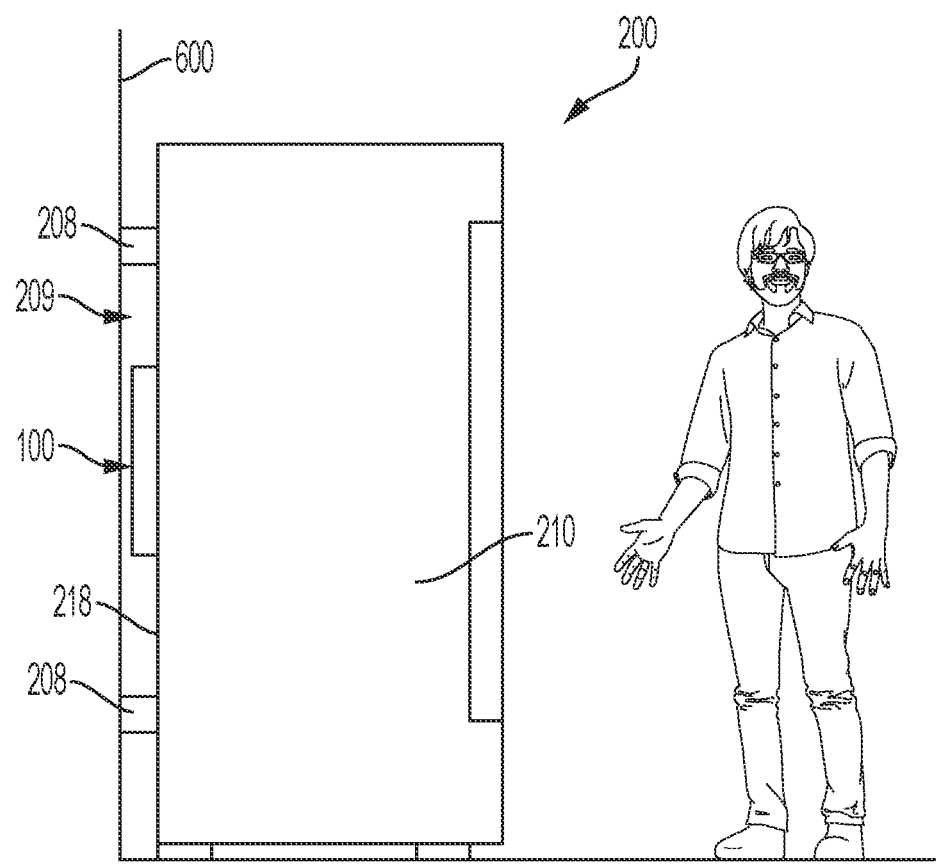
FIG. 8 shows a side view of a product storage cabinet having a control assembly mounted on a rear wall of the product storage cabinet according to an embodiment.

In some embodiments, control assembly 100 may be mounted on a rear wall 218 of housing 210 of product storage cabinet 200, as shown in FIGS. 7 and 8. Support structure 110 may be arranged in a vertical plane and may be placed flush against rear wall 218. Product storage cabinet 200 may be arranged with rear wall 218 facing a wall 600, such as a wall in a room or building in which product storage cabinet 200 is located, as shown in FIG. 8. As a result, control assembly 100 is not readily visible to or accessible by consumers. In such embodiments, rear wall 218 of product storage cabinet 200 may include one or more bumpers 208 configured to maintain a space 209 between rear wall 218 of product storage cabinet 200 and wall 600. In this way, when product storage cabinet 200 is installed, bumpers 208 ensure space 209 is provided for control assembly 100 to prevent damage to control assembly 100 due to compression of control assembly 100 against wall 600 and promote air circulation for cooling of control assembly 100. Thus, the modular control assembly may be mounted on an upper end of the product storage cabinet, in a canopy of the product storage cabinet, on a rear wall of the product storage cabinet, in a lower compartment of the product storage compartment, or may be located remotely from the product storage cabinet as described herein based on the desired mounting location for a particular product storage cabinet.

Figure 9:
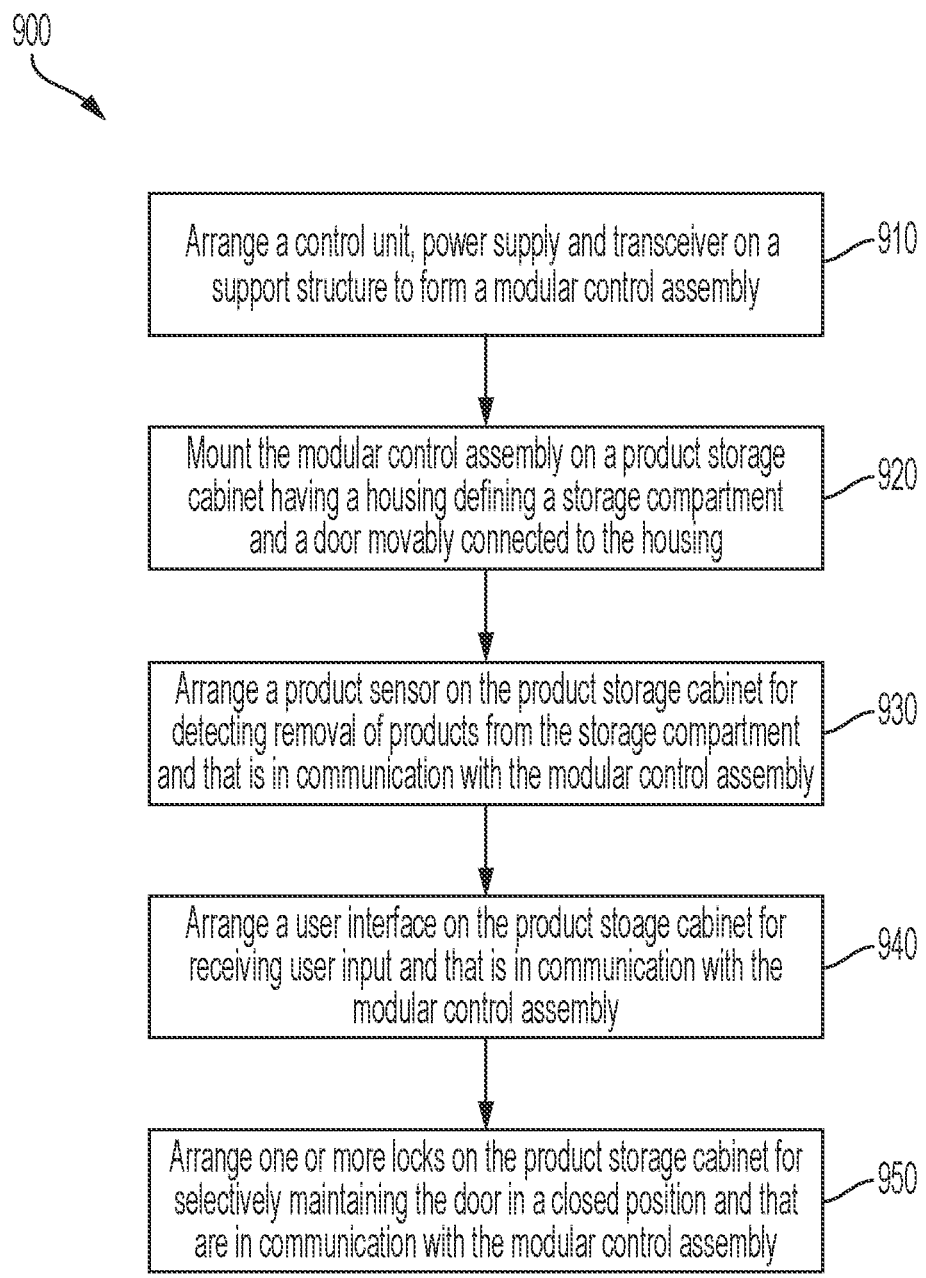
FIG. 9 shows an exemplary method of manufacturing a vending machine using a modular control assembly.

An exemplary method of manufacturing a smart vending machine using a modular control assembly 900 as described herein is shown in FIG. 9. Computing components, such as a control unit, a power supply, and a transceiver may be arranged on a support structure to form a modular control assembly 910. In some embodiments, modular control assembly may include additional or fewer components and may include all computing components necessary for operating the vending machine. For example, in some embodiments, modular control assembly may further include a temperature controller configured to control a temperature within the product storage cabinet. Modular control assembly may be mounted on a product storage cabinet having a housing defining a storage compartment and a door movably connected to the housing 920. Any of various product storage cabinets may be selected to form the smart vending machine, and the same modular control assembly may be used to provide the computing components to operate the vending machine. A product sensor may be arranged on the product storage cabinet for detecting removal of products from the storage compartment, and the product sensor may be in communication with the modular control assembly 930. A user interface may be arranged on the product storage cabinet for receiving user input, and the user interface may be in communication with the modular control assembly 940. Some embodiments may further include arranging one or more locks on the product storage cabinet for maintaining the door in a closed position, wherein the locks are in communication with the modular control assembly 950. In this way, the modular control assembly may be used to convert any of various product storage cabinets into a smart vending machine, or to retrofit a vending machine into a smart vending machine.

Figure 10:
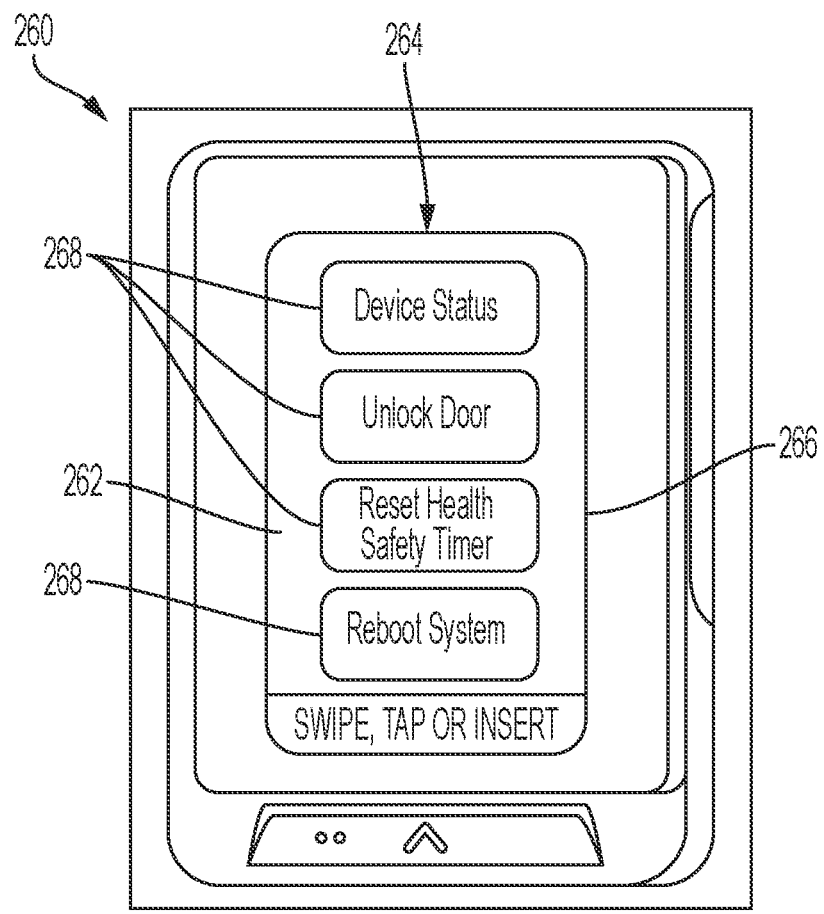
FIG. 10 shows a view of a user interface of a vending machine displaying a service menu according to an embodiment.

In some embodiments, modular control assembly 100 may be serviced via user interface 260 of the vending machine, as shown in FIG. 10. In this way, a technician need not physically access control assembly 100 of the vending machine. In some embodiments, user interface 260 may include a display 262, such as a touchscreen display. User interface 260 may be configured to display a graphical user interface 264 that includes a digital service menu 266. In some embodiments, a passcode may be required to reach digital service menu 266. Alternatively, technician may use a software application on a mobile electronic device or may scan a QR code to access digital service menu 266. Digital service menu 266 may include one or more icons 268 that may allow the technician to receive status information regarding the control assembly, unlock a door of product storage cabinet such as for restocking products, manage inventory, adjust product prices, update software or firmware, adjust temperature settings such as temperature thresholds for product spoilage, reset a health safety timer, troubleshoot issues with product sensors, payment processing unit, or wireless signal reception, or reboot the control assembly, among other tasks.

Figure 11:
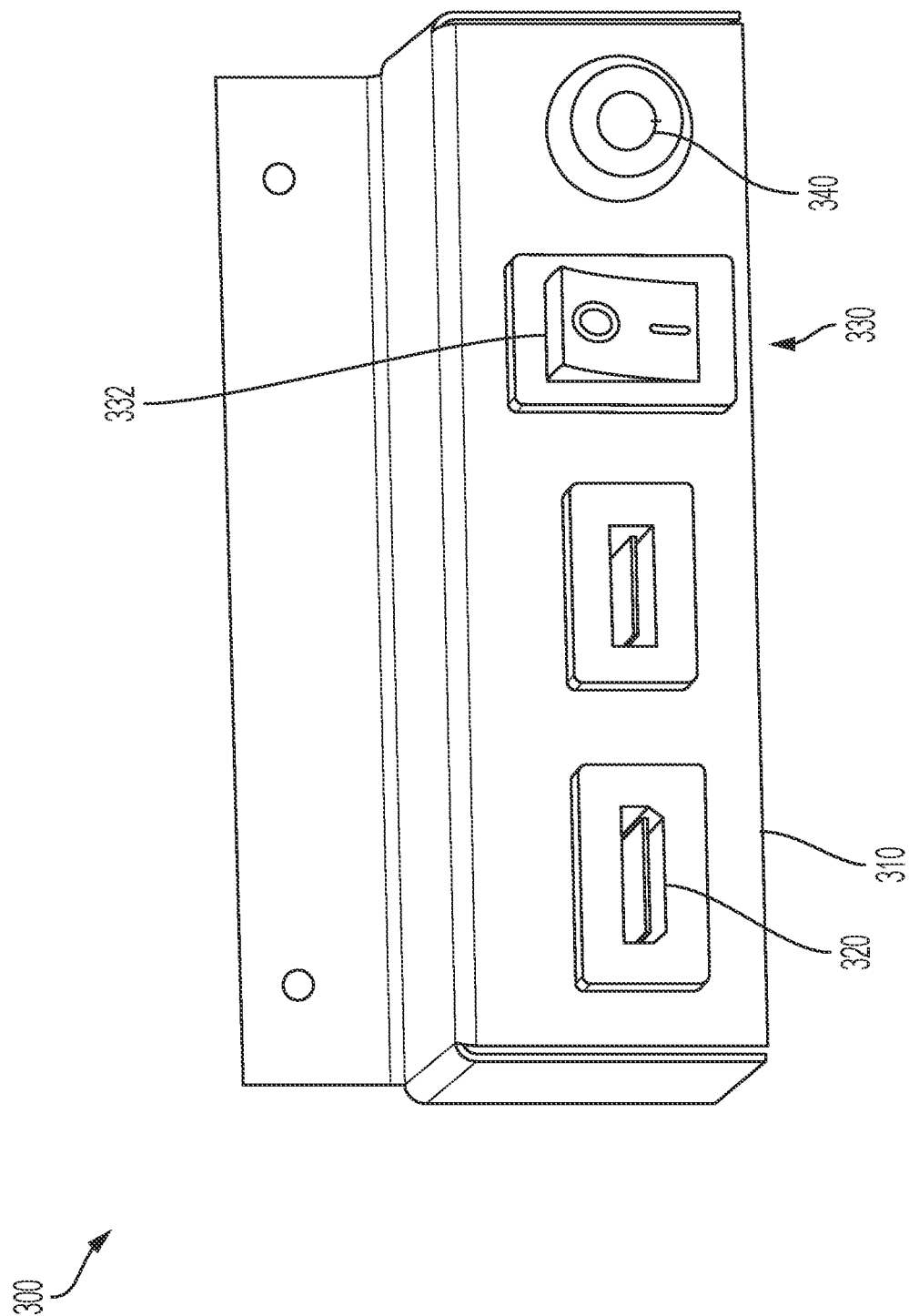
FIG. 11 shows a perspective view of a service panel according to an embodiment.
Figure 12:
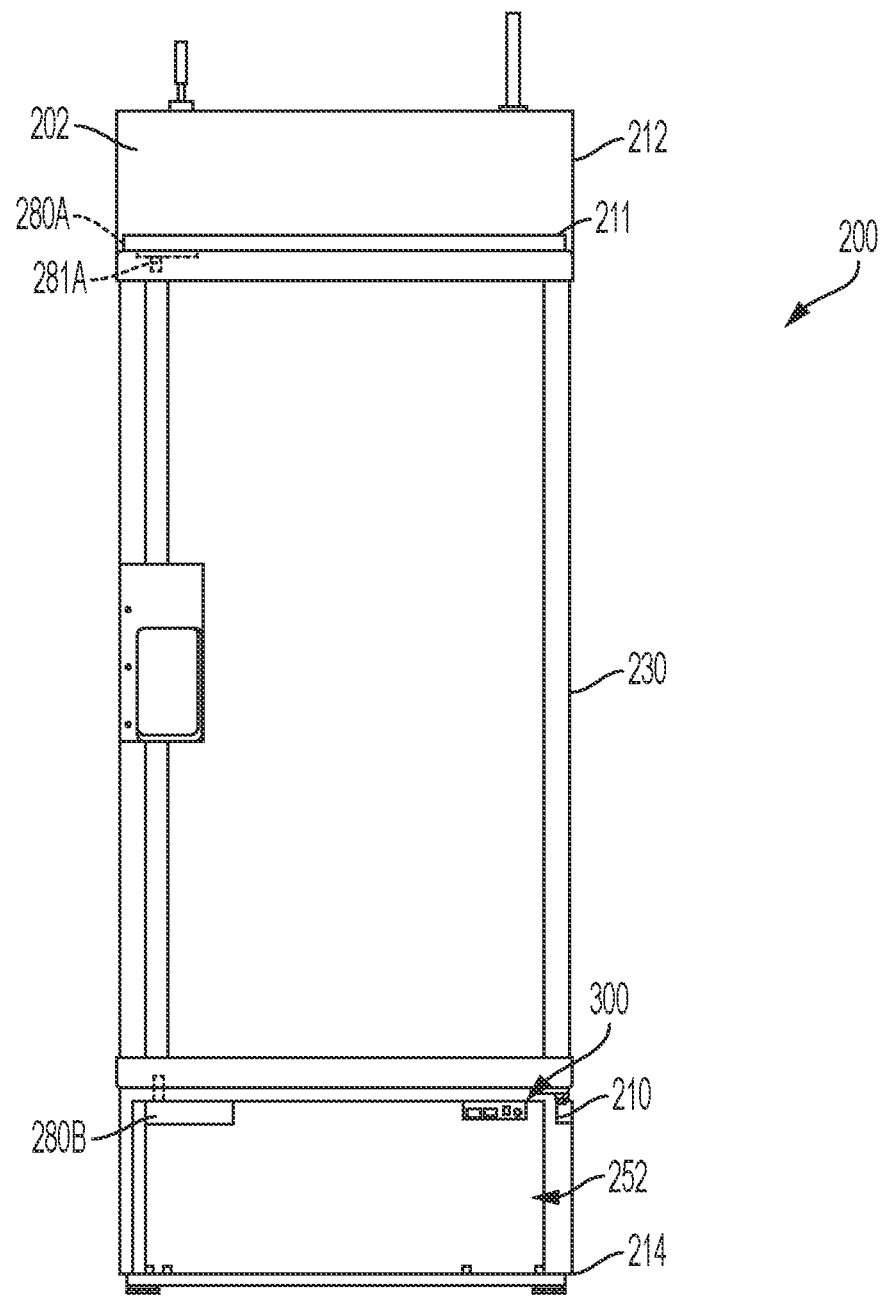
FIG. 12 shows a front view of a product storage cabinet having the service panel of FIG. 11.

In some embodiments, control assembly 100 may be serviced via a service panel 300 in communication with control assembly 100, as shown in FIGS. 11-12. Service panel 300 may be accessed by a technician to service control assembly 100 without having to directly access control assembly 100. In this way, service panel 300 may further facilitate service and maintenance of control assembly 100. Service panel 300 may have a small size relative to control assembly 100 and thus may be more easily arranged at a convenient location on a product storage cabinet.

As best shown in FIG. 11, service panel 300 may include an interface 310. Interface 310 may include one or more ports 320, including for example a universal serial bus (USB) port to enable data transfer to and from control assembly 100. In some embodiments, ports 320 may be used for transfer of product detection data from product sensors, such as product image data. Ports 320 may be used to transfer an activity or service log from control assembly 100. Ports 320 may also be used for installation of software and firmware, and to update the user interface. Interface 310 may include one or more actuators 330, such as switches, buttons, dials, levers, or the like for controlling operation of control assembly 100. In some embodiments, actuator 330 may include a power switch 332 for turning power supply of control assembly 100 on or off.

In some embodiments, service panel 300 may include a lock 340. Lock 340 may be configured to maintain a cover or grille in position over service panel 300 in order to cover and prevent access to interface 310 of service panel 300. In order to access service panel 300, a technician may use a key to unlock lock 340 and remove the cover or grille.

In some embodiments, service panel 300 may be arranged at a front end of product storage cabinet 200 so that service panel 300 can be easily accessed by a technician. In some embodiments, service panel 300 may be arranged in lower compartment 252, as shown for example in FIG. 12. Service panel 300 may be mounted to housing 210 in lower compartment 252 at lower end 214 of housing 210. Service panel 300 may be covered by grille of product storage cabinet 200. In this way, service panel 300 can be easily accessed by a technician from the front of product storage cabinet 200 by removing grille from housing 210 to reveal lower compartment 252 and service panel 300.

In some embodiments, as shown in FIG. 12, product storage cabinet 200 may further include one or more locks 280 configured to maintain door 230 in a closed position. Locks 280 may include electronic locks such that locks 280 may be in communication with control assembly 100 which may activate and deactivate locks 280. In some embodiments, locks 280 may be arranged on a doorframe 211 of housing 210. Locks 280 may be arranged inside of housing 210 so that locks 280 are not visible to or accessible by consumers. In this way, locks 280 do not detract from the appearance of the product storage cabinet 200 and are protected from damage or tampering. Locks 280 may include retractable pins 281 such that when lock 280 is activated, pins 281 engage recesses of door 230 configured to receive pins 281 in order to maintain the door 230 in the closed position.

In some embodiments as shown in FIG. 12, a first lock 280A may be arranged at upper end 212 of housing 210 and may be covered by a canopy of product storage cabinet 200. Product storage cabinet 200 may include a second lock 280B at lower end 214 of storage compartment 220. Second lock 280B may be mounted to housing 210 in lower compartment 252. The use of a first lock 280A and a second lock 280B may enhance security and ensure door 230 remains in the closed position. In product storage cabinets 200 having one lock, such as first lock 280A alone, an attempt to open door 230 may allow a lower portion of door which lacks a lock to be moved away from housing 210. This may place an uneven force on a hinge of door 230 which may damage the hinge or door.

As described herein, control assembly 100 may control operation of vending machine and may unlock the lock of the door upon receipt of user input at user interface, such as receipt of payment or authentication of the consumer, receive and process data from the product sensors to determine an identity of products removed from storage compartment, determine the price of the products removed, and process payment such as by charging the consumer's payment source or account, among other tasks. Control assembly 100 may further regulate a temperature of storage compartment in embodiments having a refrigerated storage compartment.

In some embodiments, control assembly 100 may be configured to monitor for a spoilage condition to ensure food safety. Control assembly 100 may be part of a vending machine that includes a product storage cabinet 200 for storing perishable products, such as juice, smoothies, yogurt, milk, fruit cups, hummus, and pre-packaged salads, among various other food and beverages. Control assembly 100 may be configured to lock a door of product storage cabinet 200 when the spoilage condition is detected in order to prevent consumers from accessing spoiled products. In some embodiments, the spoilage condition may be a temperature within the storage compartment above a predetermined spoilage temperature. In some embodiments, the spoilage condition may further include a minimum amount of time at which the temperature is above the predetermined spoilage temperature. For example, the spoilage condition may be that the temperature within the storage compartment 220 is above 41° F. for 40 minutes or more.

Figure 13:
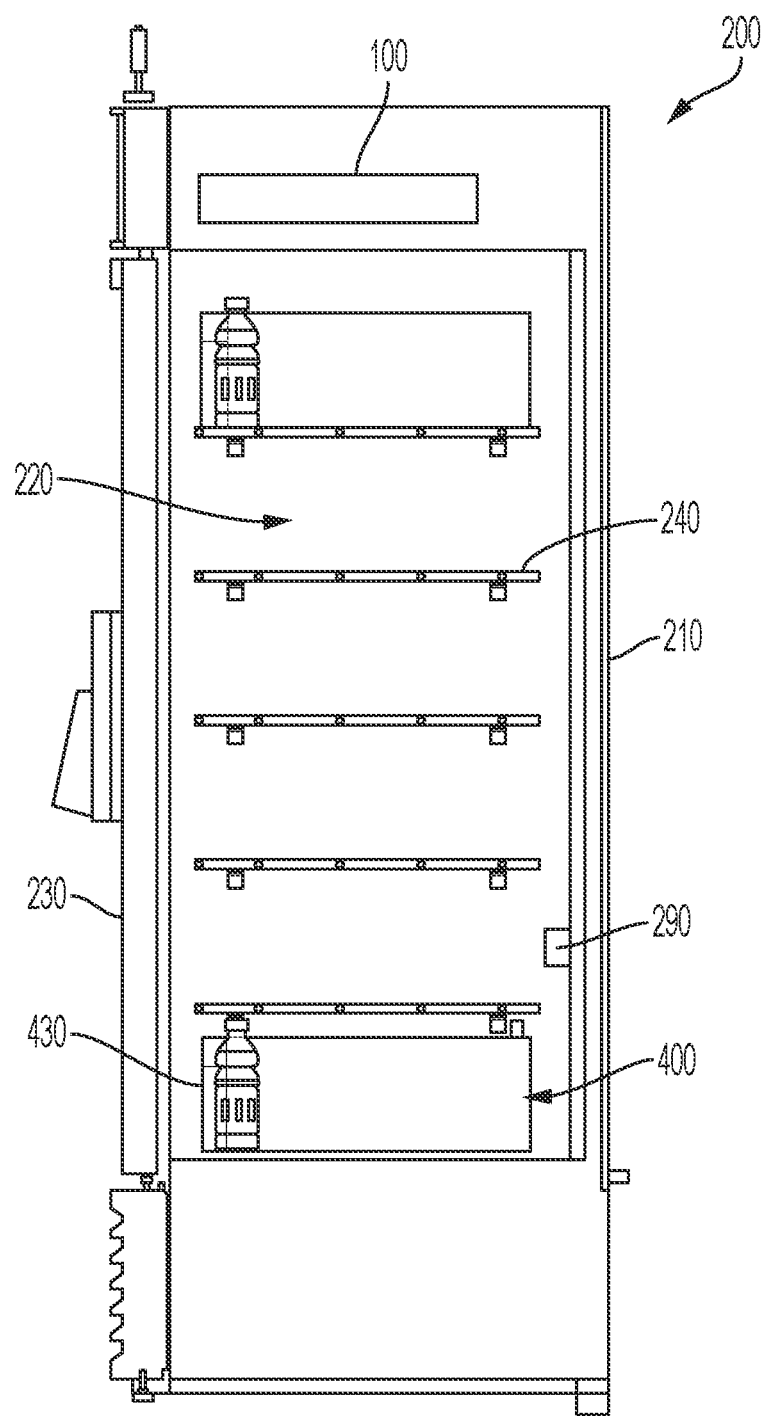
FIG. 13 shows a side view of a product storage cabinet that includes a temperature-regulated tray according to an embodiment.

In some embodiments, the product storage cabinet 200 of a vending machine may include a temperature-regulated tray 400 for storing perishable products, as shown in FIG. 13. Temperature-regulated tray 400 may be arranged within storage compartment 220 of a product storage cabinet 200 and used to store perishable products while other products, such as non-perishable products, may be stored in a remainder of the storage compartment 220. Temperature-regulated tray 400 may help to maintain the temperature of the perishable products at a desired storage temperature. Further, upon detection of the spoilage condition, such as by a temperature sensor 290 in storage compartment 220, the vending machine may lock tray 400 to prevent access to the perishable products while allowing the non-perishable products in storage compartment to be accessed. This allows the vending machine to continue to be used despite occurrence of the spoilage condition.

In some embodiments, tray 400 may be sized and shaped to occupy an entire shelf 240 of within storage compartment 220. Alternatively, tray 400 may be sized and shaped to occupy a portion of a shelf 240, such as half of a shelf 240. The size of the tray 400 may be selected based on the amount of perishable items to be stored.

Figure 14:
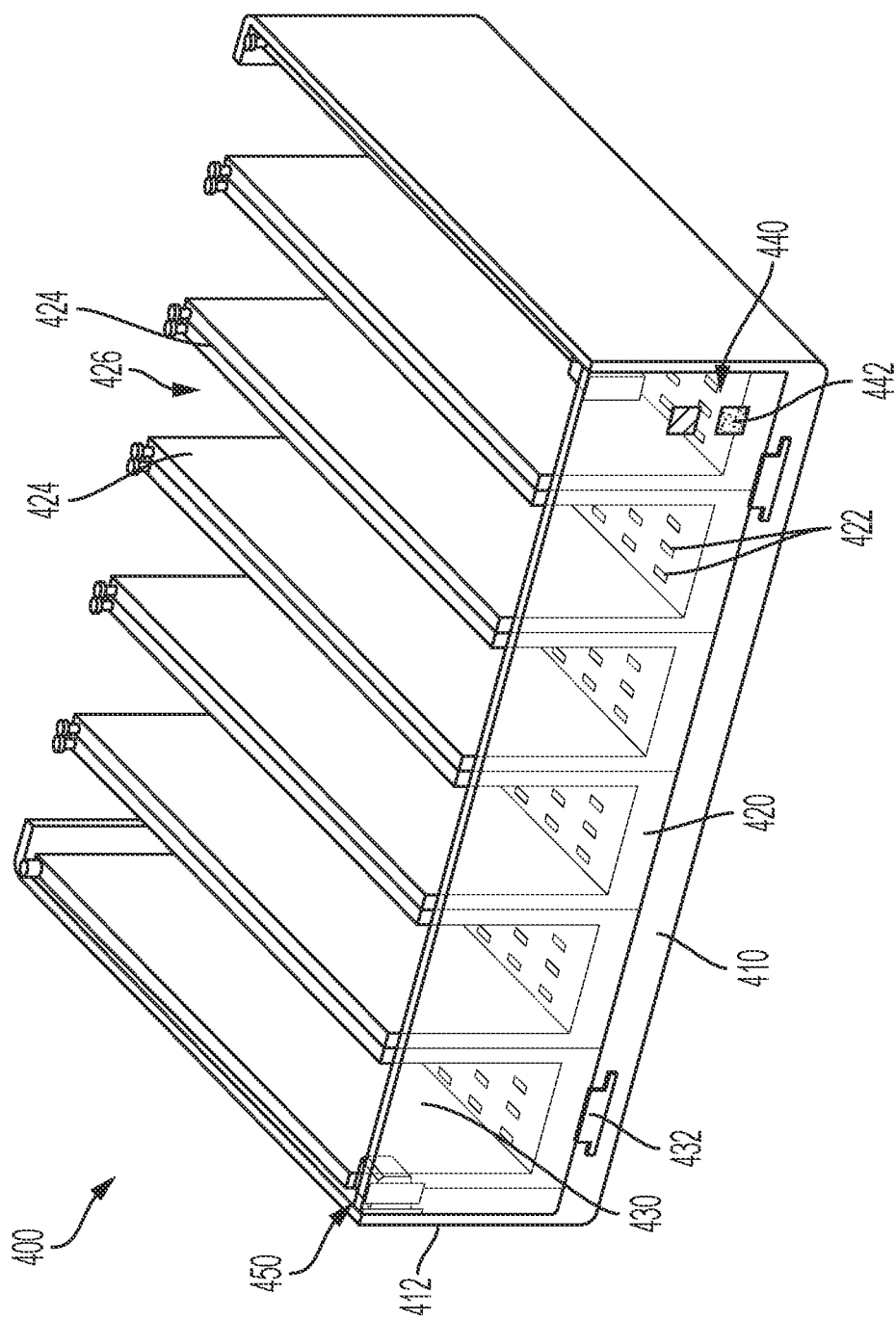
FIG. 14 shows a perspective view of a temperature-regulated tray according to an embodiment.

Tray 400 may include a base 410 having a thermal element 420, as shown for example in FIG. 14. Thermal element 420 may be arranged on all or on a portion of base 410. In some embodiments, tray 400 may include upstanding sidewalls 412. Thermal element 420 may extend along sidewall 412. In some embodiments, tray 400 may further include dividers 424 that define rows 426 in which products may be stored. In some embodiments, dividers 424 may be formed by thermal element 420. In some embodiments, base 410 may include a plurality of openings 422 to promote airflow through tray 400.

In some embodiments, thermal element 420 may include a thermal insulation. For example, thermal insulation may include expanded polystyrene (EPS) foam. Thermal insulation may passively control temperature by inhibiting heat transfer. In some embodiments, thermal element 420 may include a phase change material (PCM). Thermal element 420 including a PCM may serve as a heat sink to remove heat. In some embodiments, thermal element 420 may include a thermoelectric cooling element to provide active cooling.

Tray 400 may further include a gate 430 connected to base 410 and movable from an open position in which products on tray 400 are accessible to a consumer to a closed position in which products on tray 400 are inaccessible to the consumer. In the closed position, gate 430 may be substantially perpendicular to base 410 of tray 400. Gate 430 may be rotatably connected to base 410 via one or more hinges 432. Alternatively, gate 430 may be slidably coupled to base 410. Gate 430 may include a transparent material so that products are visible when gate 430 is in the closed position. Tray 400 may include a lock 450 that can be activated to maintain gate 430 in the closed position.

When the spoilage condition is detected in the storage compartment, control assembly 100 of vending machine may activate lock 450 to maintain gate 430 in the closed position. In this way, the spoiled perishable products cannot be accessed by consumers, but the remainder of the products in the storage compartment are accessible to the consumer. In some embodiments, gate 430 is arranged in the open position until the spoilage condition is detected, and gate 430 is automatically moved into the closed position.

In some embodiments, tray 400 may further include an indicator 440 configured to indicate to a consumer that the products may not be accessed, for example, upon occurrence of the spoilage condition. In some embodiments, indicator 440 may include one or more lights 442, such as light emitting diodes. A first light may be illuminated when the products are accessible, and upon detection of the spoilage condition, the first light may darken and a second light may illuminate to indicate that the products are not accessible. Alternatively, a single light may be used and the light may illuminate in a first color when the products are available and may illuminate in a second color that differs from the first color when the spoilage condition occurs. For example, the light may initially illuminate in green, and upon spoilage, the light may illuminate in red.

Figure 15:
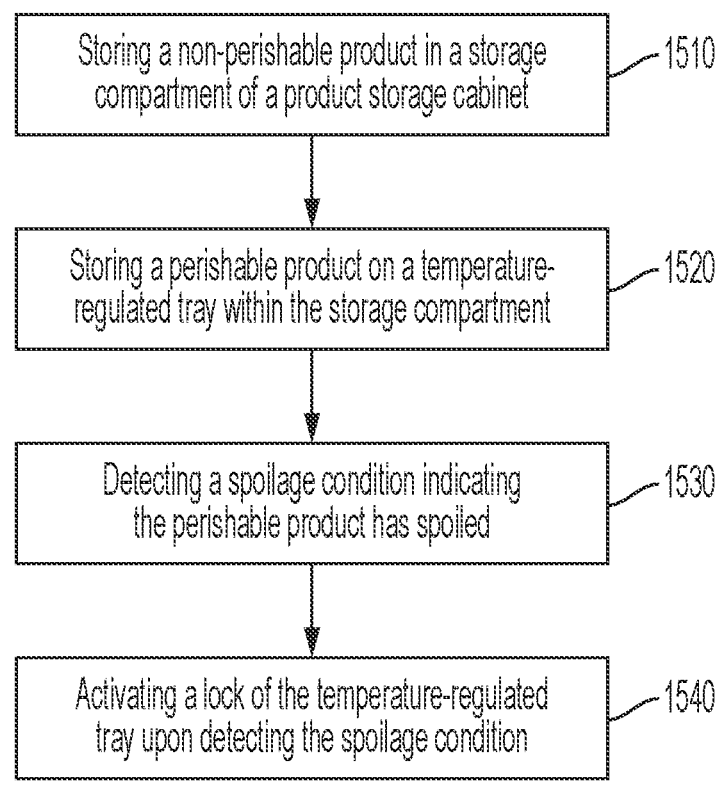
FIG. 15 shows an exemplary method of operating a vending machine for storing perishable products according to an embodiment.

An exemplary method of storing perishable products in a vending machine is shown in FIG. 15. A non-perishable product is stored in a storage compartment of a product storage cabinet 1510, and a perishable product is stored on a temperature-regulated tray arranged within the storage compartment 1520. The temperature-regulated tray includes a base having a thermal element, a gate movable from an open position to a closed position, and a lock configured to maintain the gate in the closed position. The vending machine may detect a spoilage condition 1530 indicating that the perishable product has spoiled. Upon detection of the spoilage condition, the control unit may activate the lock of the tray to maintain the gate in the closed position to prevent consumers from accessing the perishable product on the tray 1540.

Figure 16:
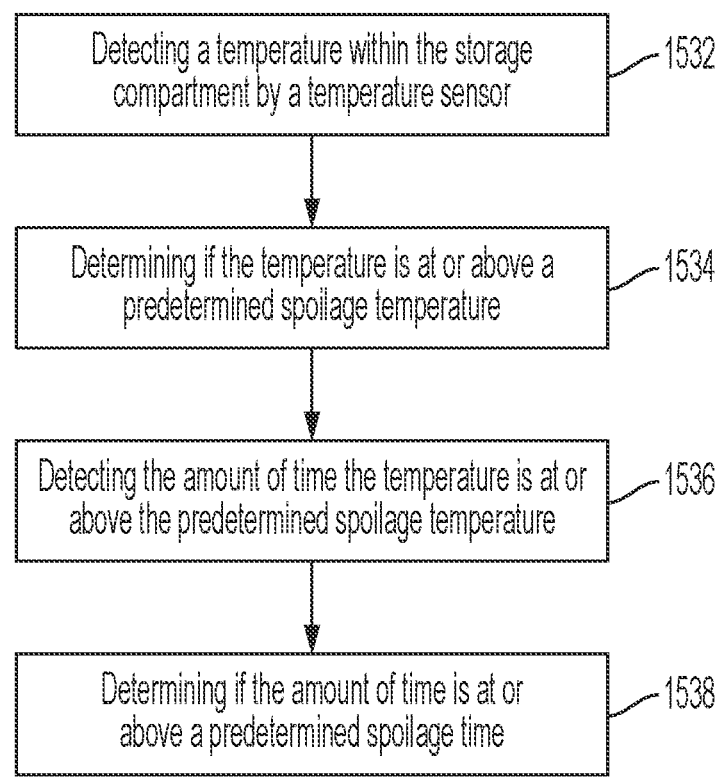
FIG. 16 shows an exemplary method of detecting a spoilage condition of a vending machine for storing perishable products according to an embodiment.

An exemplary method of detecting a spoilage condition 1530 is shown in FIG. 16. Detecting the spoilage condition may include detecting a temperature within the storage compartment by a temperature sensor 1532. The vending machine may determine if the temperature detected by the temperature sensor is at or above a predetermined spoilage temperature 1534. The vending machine may further detect the amount of time the temperature is at or above the predetermined spoilage temperature 1536. The vending machine may determine if the amount of time is at or above a predetermined spoilage time 1538.

Figure 17:
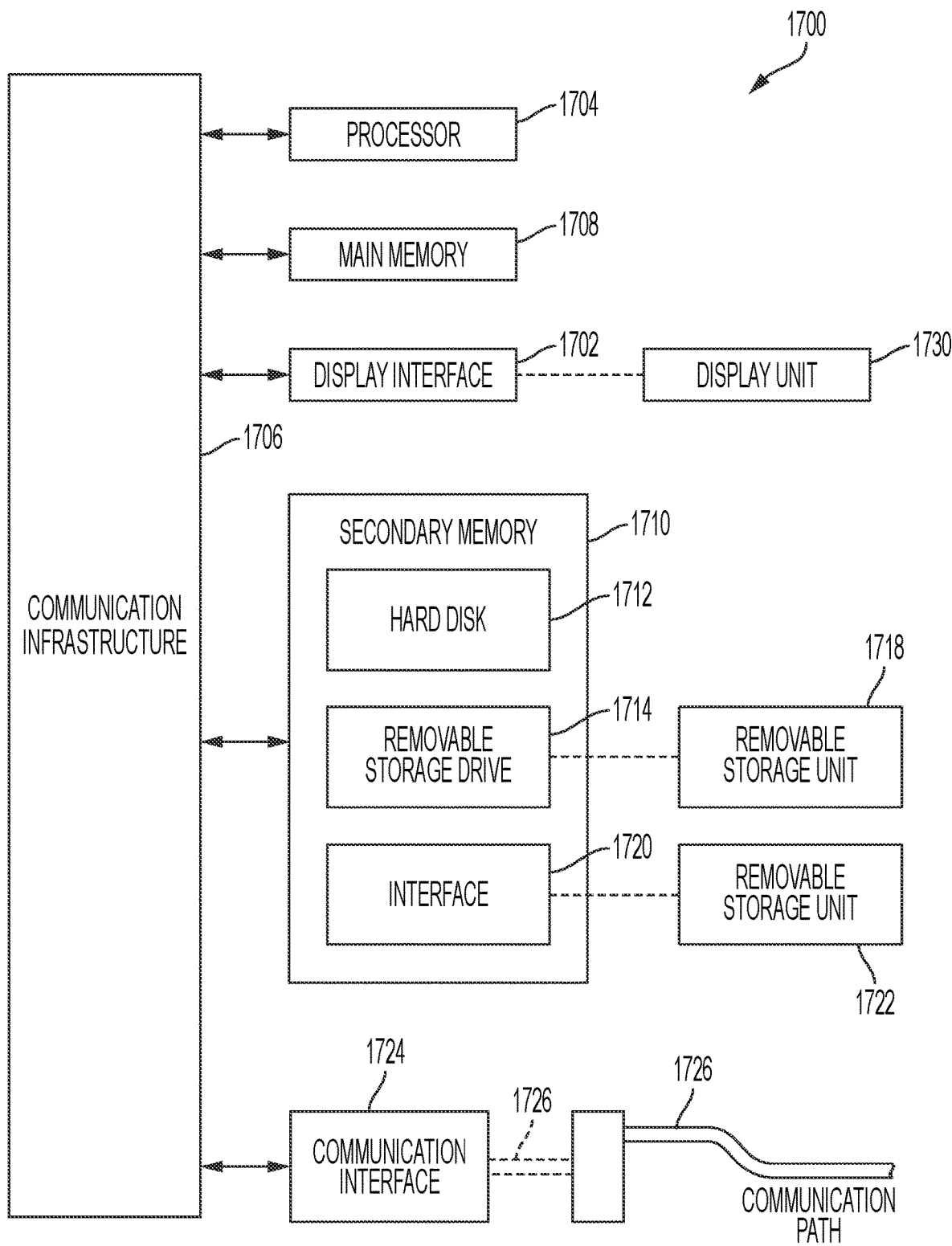
FIG. 17 shows a schematic block diagram of an exemplary computer system in which embodiments may be implemented.

FIG. 17 illustrates an exemplary computer system 1700 in which embodiments, or portions thereof, may be implemented as computer-readable code. Control unit 120 as discussed herein may be computer systems having all or some of the components of computer system 1700 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 1700. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In some embodiments, edge computing, cloud computing, or a combination thereof may be used. In addition, in some embodiments the order of operations may be rearranged without departing from the spirit of the disclosed subject matter.

Processor device 1704 may be a special purpose or a general purpose processor device. As will be appreciated by persons skilled in the relevant art, processor device 1704 may also be a single processor in a multi-core/multiprocessor system, such system operating alone, or in a cluster of computing devices operating in a cluster or server farm. Processor device 1704 is connected to a communication infrastructure 1706, for example, a bus, message queue, network, or multi-core message-passing scheme. Computer system 1700 may further include a graphics processing unit (GPU) configured to provide video and image processing capabilities.

Computer system 1700 also includes a main memory 1708, for example, random access memory (RAM), and may also include a secondary memory 1710. Secondary memory 1710 may include, for example, a hard disk drive 1712, or removable storage drive 1714. Removable storage drive 1714 may include a floppy disk drive, a magnetic tape drive, an optical disk drive, a flash memory, or the like. The removable storage drive 1714 reads from and/or writes to a removable storage unit 1718 in a well-known manner. Removable storage unit 1718 may include a floppy disk, magnetic tape, optical disk, a universal serial bus (USB) drive, etc. which is read by and written to by removable storage drive 1714. As will be appreciated by persons skilled in the relevant art, removable storage unit 1718 includes a computer usable storage medium having stored therein computer software and/or data.

Computer system 1700 (optionally) includes a display interface 1702 (which can include input and output devices such as keyboards, mice, etc.) that forwards graphics, text, and other data from communication infrastructure 1706 (or from a frame buffer not shown) for display on display unit 1730.

In alternative implementations, secondary memory 1710 may include other similar means for allowing computer programs or other instructions to be loaded into computer system 1700. Such means may include, for example, a removable storage unit 1722 and an interface 1720. Examples of such means may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 may also include a communication interface 1724. Communication interface 1724 allows software and data to be transferred between computer system 1700 and external devices. Communication interface 1724 may include a modem, a network interface (such as an Ethernet card), a communication port, a PCMCIA slot and card, or the like. Software and data transferred via communication interface 1724 may be in the form of signals, which may be electronic, electromagnetic, optical, or other signals capable of being received by communication interface 1724. These signals may be provided to communication interface 1724 via a communication path 1726. Communication path 1726 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1718, removable storage unit 1722, and a hard disk installed in hard disk drive 1712. Computer program medium and computer usable medium may also refer to memories, such as main memory 1708 and secondary memory 1710, which may be memory semiconductors (e.g. DRAMs, etc.).

Computer programs (also called computer control logic) are stored in main memory 1708 and/or secondary memory 1710. Computer programs may also be received via communication interface 1724. Such computer programs, when executed, enable computer system 1700 to implement the embodiments as discussed herein. In particular, the computer programs, when executed, enable processor device 1704 to implement the processes of the embodiments discussed here. Accordingly, such computer programs represent controllers of the computer system 1700. Where the embodiments are implemented using software, the software may be stored in a computer program product and loaded into computer system 1700 using removable storage drive 1714, interface 1720, and hard disk drive 1712, or communication interface 1724.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A vending machine, comprising:
    a product storage cabinet, comprising:
        a housing defining a storage compartment for storing a product;
        a door movably connected to the housing; and
        a product sensor configured to detect removal of the product from the storage compartment;
    a control assembly configured to control operation of the vending machine, the control assembly comprising:
        a support structure;

a control unit mounted on the support structure;
a transceiver mounted on the support structure; and
a power supply mounted on the support structure,
wherein the control assembly is configured to receive information collected by the product sensor to determine an identity of the product removed from the storage compartment, wherein the control assembly further comprises a cap securable to the support structure to enclose the control unit, the transceiver, and the power supply within the cap.

2. The vending machine of claim 1, further comprising a user interface comprising a display, and wherein the user interface is in communication with the control assembly.

3. The vending machine of claim 1, wherein the product storage cabinet further comprises a cooling unit.

4. The vending machine of claim 1, wherein the product storage cabinet further comprises one or more locks configured to maintain the door in a closed position, wherein the one or more locks are arranged within the housing.

5. The vending machine of claim 1, wherein the product storage cabinet further comprises a canopy at an upper end of the housing, and wherein the control assembly is arranged within the canopy.

6. The vending machine of claim 1, wherein the housing of the product storage cabinet further defines a lower compartment, and wherein the control assembly is arranged within the lower compartment.

7. The vending machine of claim 1, wherein the control assembly is arranged on a rear wall of the product storage cabinet, and wherein the rear wall comprises one or more bumpers.

8. The vending machine of claim 1, wherein the control assembly is arranged on an upper end of the product storage cabinet.

9. The vending machine of claim 1, wherein the control assembly is arranged remotely from the product storage cabinet.

10. The vending machine of claim 1, further comprising a service panel in communication with the control assembly, wherein the service panel comprises a port configured to communicate data to and from the control assembly.

11. The vending machine of claim 10, wherein the housing of the product storage cabinet further defines a lower compartment, and wherein the service panel is arranged within the lower compartment.

12. A method of manufacturing a smart vending machine, the method comprising:
arranging a control unit, a power supply, a transceiver, and a temperature controller on a support structure to form a modular control assembly;
mounting the modular control assembly on a product storage cabinet, wherein the product storage cabinet comprises a housing defining a storage compartment and a door movably connected to the housing;
arranging a product sensor on the product storage cabinet, wherein the product sensor is configured to detect removal of a product from the storage compartment; and
arranging a user interface on the product storage cabinet for receiving a user input, wherein the modular control assembly is in communication with the product sensor and the user interface.

13. The method of claim 12, further comprising mounting one or more locks on the product storage cabinet, wherein the one or more locks are configured to maintain the door in a closed position, and wherein the one or more locks are in communication with the modular control assembly.

14. A modular vending machine, comprising:
a product storage cabinet, comprising:
a housing defining a storage compartment, and
a door movably connected to the housing;
a temperature-regulated tray arranged in the storage compartment, the tray comprising:
a base comprising a thermal element configured to control a temperature of a product arranged on the tray,
a gate connected to the tray and movable from an open position to a closed position, and
a lock configured to maintain the gate in the closed position when the lock is activated; and
a control assembly mounted on the product storage cabinet, wherein the control assembly is configured to activate the lock of the temperature-regulated tray when a spoilage condition is detected.

15. The vending machine of claim 14, wherein the control assembly comprises a support structure, a control unit mounted on the support structure, and a power supply mounted on the support structure.

16. The vending machine of claim 14, further comprising a temperature sensor, wherein the spoilage condition comprises a temperature within the storage compartment at or above a predetermined spoilage temperature as determined by the temperature sensor.

17. The vending machine of claim 16, wherein the spoilage condition further comprises a minimum amount of time at which the temperature within the storage compartment is at or above the predetermined spoilage temperature.

18. The vending machine of claim 16, wherein the temperature-regulated tray further comprises an indicator light configured to indicate whether the lock is activated.

19. A vending machine, comprising:
a product storage cabinet, comprising:
a housing defining a storage compartment for storing a product;
a door movably connected to the housing; and
a product sensor configured to detect removal of the product from the storage compartment;
a control assembly configured to control operation of the vending machine, the control assembly comprising:
a support structure;
a control unit mounted on the support structure;
a transceiver mounted on the support structure;
a power supply mounted on the support structure, and
wherein the control assembly is configured to receive information collected by the product sensor to determine an identity of the product removed from the storage compartment,
wherein the product storage cabinet further comprises a canopy at an upper end of the housing, and wherein the control assembly is arranged within the canopy.

20. A vending machine, comprising:
a product storage cabinet, comprising:
a housing defining a storage compartment for storing a product;
a door movably connected to the housing; and
a product sensor configured to detect removal of the product from the storage compartment;
a control assembly configured to control operation of the vending machine, the control assembly comprising:
a support structure;
a control unit mounted on the support structure;
a transceiver mounted on the support structure; and
a power supply mounted on the support structure, wherein the control assembly is configured to receive information collected by the product sensor to determine an identity of the product removed from the storage compartment, and wherein the control assembly is arranged on a rear wall of the product storage cabinet, and wherein the rear wall comprises one or more bumpers.

21. A vending machine, comprising:

a product storage cabinet, comprising:
- a housing defining a storage compartment for storing a product;
- a door movably connected to the housing; and
- a product sensor configured to detect removal of the product from the storage compartment;

a control assembly configured to control operation of the vending machine, the control assembly comprising:
- a support structure;
- a control unit mounted on the support structure;
- a transceiver mounted on the support structure; and
- a power supply mounted on the support structure, wherein the control assembly is configured to receive information collected by the product sensor to determine an identity of the product removed from the storage compartment; and a service panel in communication with the control assembly, wherein the service panel comprises a port configured to communicate data to and from the control assembly.

22. The vending machine of claim 21, wherein the housing of the product storage cabinet further defines a lower compartment, and wherein the service panel is arranged within the lower compartment.

* * * * *